June 17, 1924.

E. F. GWYNN ET AL

MOTOR REVERSE CONTROL

Filed May 12, 1921

1,497,847

INVENTORS

Patented June 17, 1924.

1,497,847

UNITED STATES PATENT OFFICE.

EMMER F. GWYNN AND HARRY H. JAMES, OF PITTSBURGH, PENNSYLVANIA.

MOTOR REVERSE CONTROL.

Application filed May 12, 1921. Serial No. 468,987.

*To all whom it may concern:*

Be it known that we, EMMER F. GWYNN and HARRY H. JAMES, citizens of the United States, and residents of Pittsburgh, in the county of Allegheny and State of Pennsylvania, have invented a new and useful Improvement in Motor Reverse Controls; and we do hereby declare the following to be a full, clear, and exact description thereof.

Our invention relates to a motor reverse control.

The object of our invention, where the device is used in connection with an electrically operated elevator, is to prevent the operator from suddenly reversing the direction of current in the motor armature by throwing the control lever from one position to the other which causes the blowing out of fuses; the stopping of the elevator at points between the floors; destructive arching across the face of the motor commutator and reversing switches, as well as the burning out of the motor armature, all of which cause aggravating delays and expensive repairs. While the above results of reversing suddenly more particularly occur in connection with the operation of elevators, it is apparent that they may occur in connection with other mechanisms, and we do not, of course, wish to confine our invention to its use in connection with elevators.

By our invention we eliminate all these troubles by preventing the operator from reversing the direction of current through the armature of the motor until it has come to rest, or substantially so, in the direction in which it is traveling.

Figure 1:
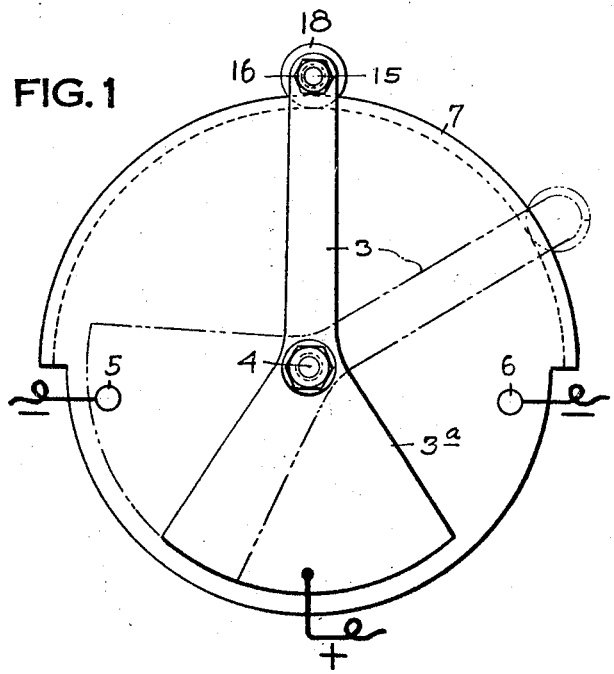
Figure 2:
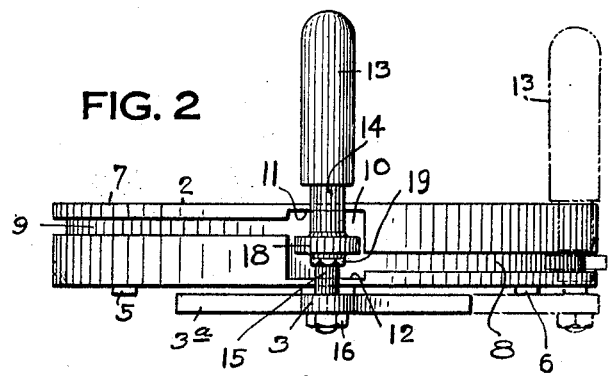
Figure 3:
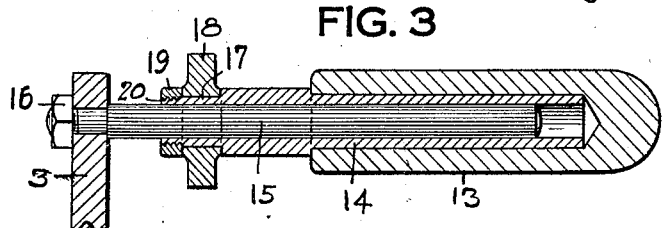

In the accompanying drawing Fig. 1 is a face view of a suitable control-box and lever showing our invention applied thereto; Fig. 2 is an edge view; and Fig. 3 is a longitudinal sectional view of the handle.

In the drawing the numeral 2 designates an ordinary control box provided with the lever 3 of the ordinary construction pivotally mounted at 4 and adapted to be moved in either direction. The customary contact points 5 and 6 are provided with which the segmental contact 3ª of the lever is brought into contact according to which direction it is desired to run the motor.

The control-box 2 is provided with the runway 7 secured thereto in any suitable manner, said runway having a groove formed therein divided into non-coinciding sections 8 and 9. The grooves 8 and 9 communicate with the central cavity 10 with the recessed portions 11 and 12.

The telescopic handle 13 is provided for operating the lever 3, said handle having the sleeve 14 inserted therein which receives the bolt 15 connected to the handle 13 by the nut 16. By this construction the handle 13 is adapted to move back and forth on the bolt 15 for the purpose more fully hereinafter set forth.

Mounted on the neck 17 of the sleeve 14 is the disc 18 which is held in place by the collar 19 screwed on to the threaded portion 20 of said neck. This disc 18, when the motor is at rest, has a portion of its circumference extending into the cavity 10, as indicated in Fig. 1.

When it is desired to operate the motor the operator grasps the handle 13 and by pushing in said handle he brings the disc 18 into register with the groove 8 of the runway and moves the handle around to the position indicated in dotted lines, Fig. 2, which brings the lever 3 into engagement with the contact point 5. This starts the motor in one direction, and when it is desired to reverse the motor the operator moves the handle in the opposite direction with the disc 18 moving in the groove 8 until he reaches the cavity 10, whereupon if he desires to reverse the motor he pulls out the handle until the disc 18 registers with the groove 9, whereupon he moves the handle in that direction until the lever engages the contact point 6. The fact that the grooves 8 and 9 do not register with each other, but are offset makes it impossible for the operator to throw the lever into reverse by one direct movement. In order to get from one groove into the other the telescopic handle 13 must be moved until he gets the disc 18 into register with the groove 9. This will occasion more or less delay, and by the time he has been able to effect this result the motor will have had an opportunity to slow down or be at rest, so that when the lever comes in to engagement with the contact point 6 the sudden or quick reversal of the motor will be avoided and the difficulties, due to the blowing out of fuses, stopping of the elevator at points between the floors, and burning out of the motor armature will be obviated.

Further delay in finding the grooves 8 and 9 will be occasioned by the recesses 11 and 12, as the operator in advancing or withdrawing the handle is very liable to bring the disc 18 into one or other of said recesses, and the difficulty of finding the grooves 8 and 9 is thereby increased.

By our invention is provided a simple and efficient mechanical device which prevents the too sudden reversal of the motor, thereby obviating the troubles above referred to. The device is of such simple character that there is practically no liability of its getting out of order, and it is economical to install, as the runway may be applied to the control boxes now in common use.

What we claim is:

1. In a motor reverse control for electric elevators, the combination with the control box and lever, of an operating handle connecting the lever and independently movable thereon, and a guide for engaging the handle for effecting retardation of movement of the lever.

2. In a motor reverse control for electric elevators, the combination with the control box and lever, of an irregular runway, a handle connected to said lever and independently movable thereon and adapted to engage said runway, whereby the movement of the lever to reverse position is retarded.

3. In a motor reverse control for electric elevators, the combination with a control box and lever, of a runway comprising non-registering ways, a handle movable to and fro connected to said lever, and a projection on said handle and movable therewith adapted to engage said ways, whereby the movement of said lever to reverse position is retarded.

4. In a motor reverse control for electric elevators, the combination with a control box and lever, of a runway comprising non-registering grooves, a handle movable to and fro connected to said lever, and a projection on said handle and movable therewith adapted to engage said grooves, whereby the movement of said lever to reverse position is retarded.

5. In a motor reverse control for electric elevators, the combination with the control-box and lever, of a runway comprising non-registering grooves communicating with a cavity formed therein, said cavity having recessed portions at each end, a handle movable to and fro connected to said lever, and a projection on said handle adapted to engage said cavity and grooves.

6. In a motor reverse control for electric elevators, the combination with a control box and lever, of a runway having an offset, a handle movable to and fro connected to said lever, and a projection on said handle and movable therewith engaging said runway, whereby the movement of said lever to reverse position is retarded.

In testimony whereof we, the said EMMER F. GWYNN and HARRY H. JAMES, have hereunto set our hands.

EMMER F. GWYNN.
HARRY H. JAMES.

Witnesses:
ROBT. D. TOTTEN,
JOHN F. WILL.